C. TAURMAN.
ELECTRICALLY OPERATED AGRICULTURAL IMPLEMENT.
APPLICATION FILED DEC. 30, 1909.
971,574.
Patented Oct. 4, 1910.
3 SHEETS—SHEET 1.
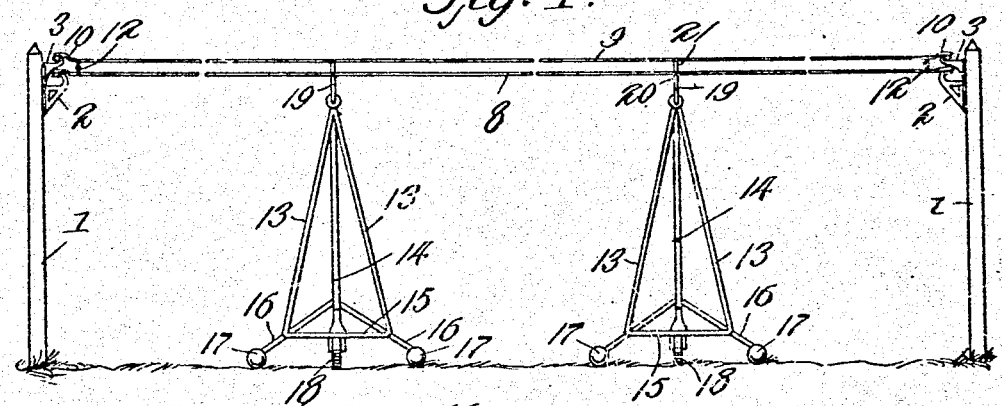
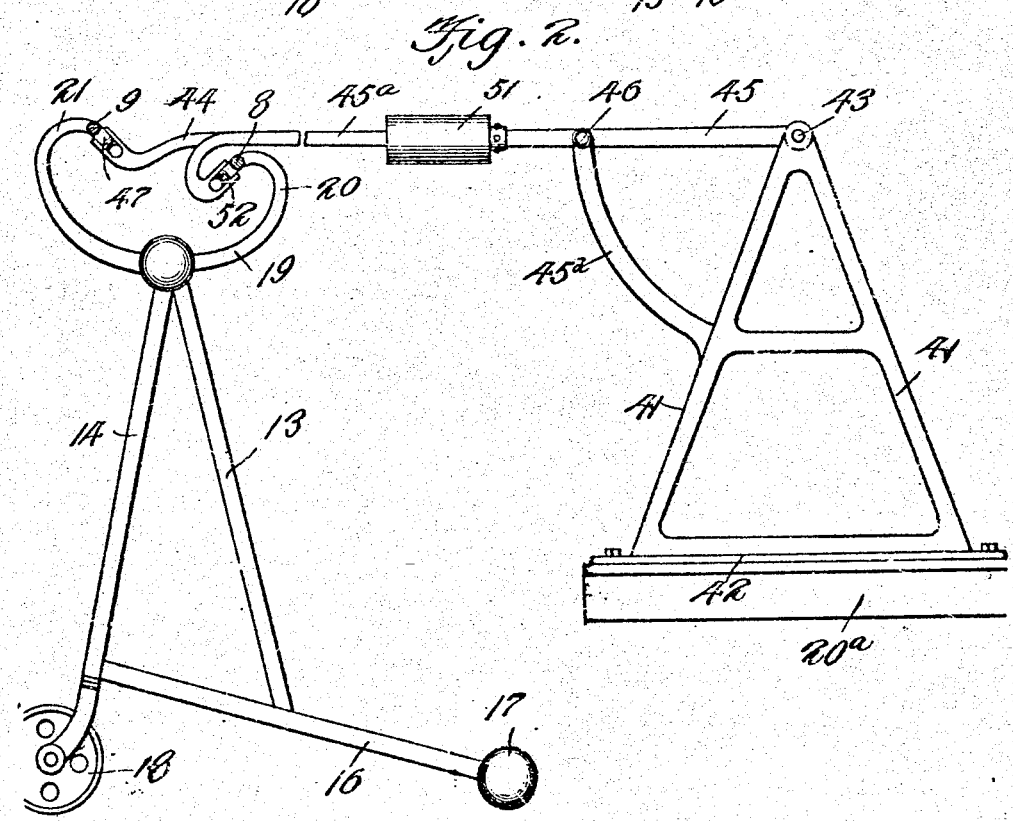

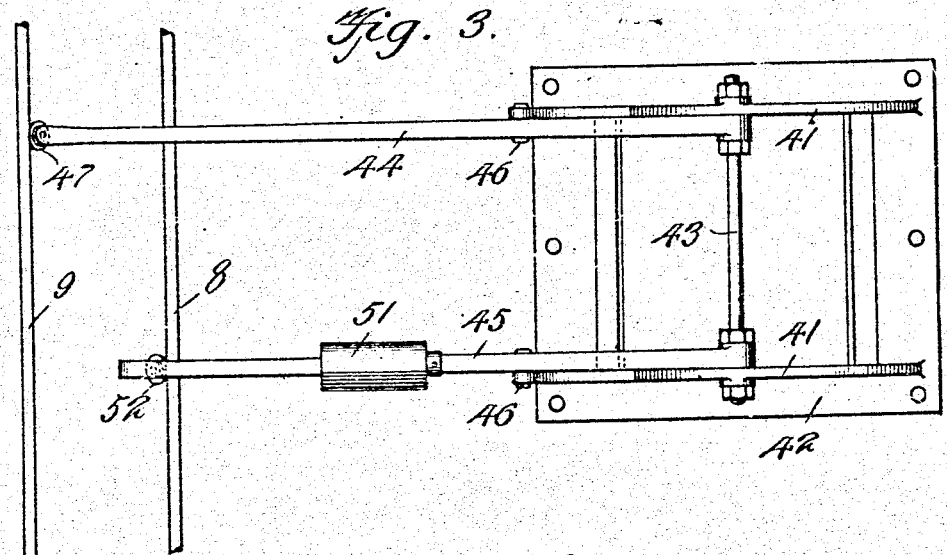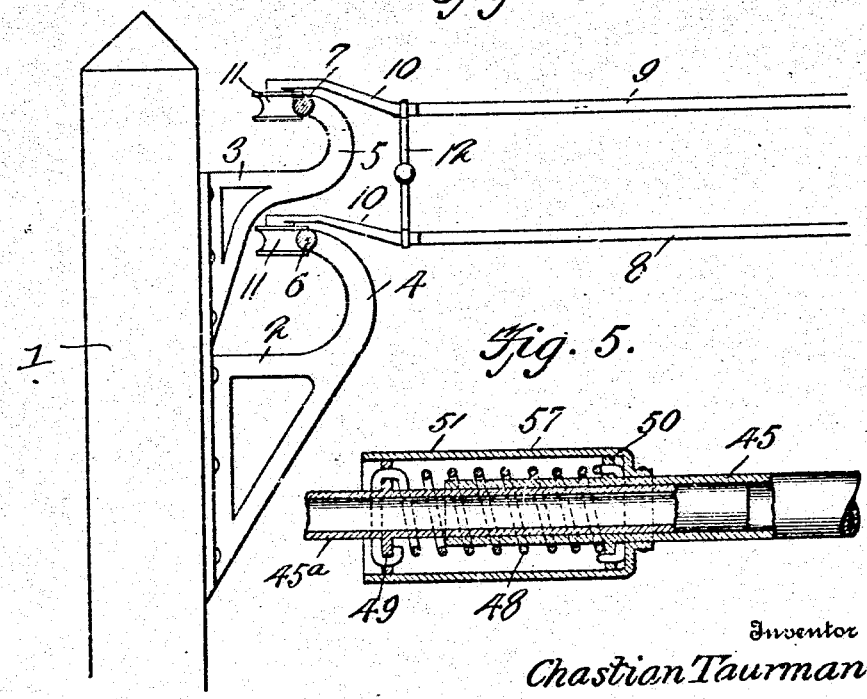

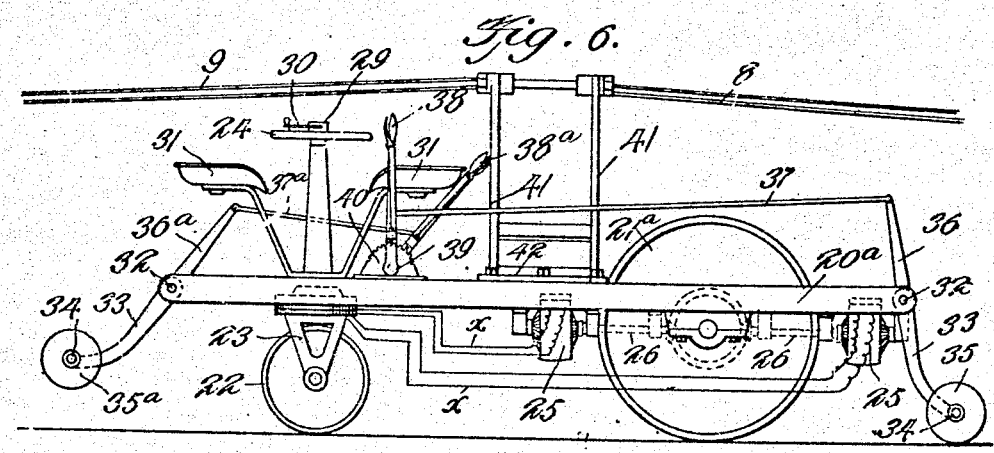
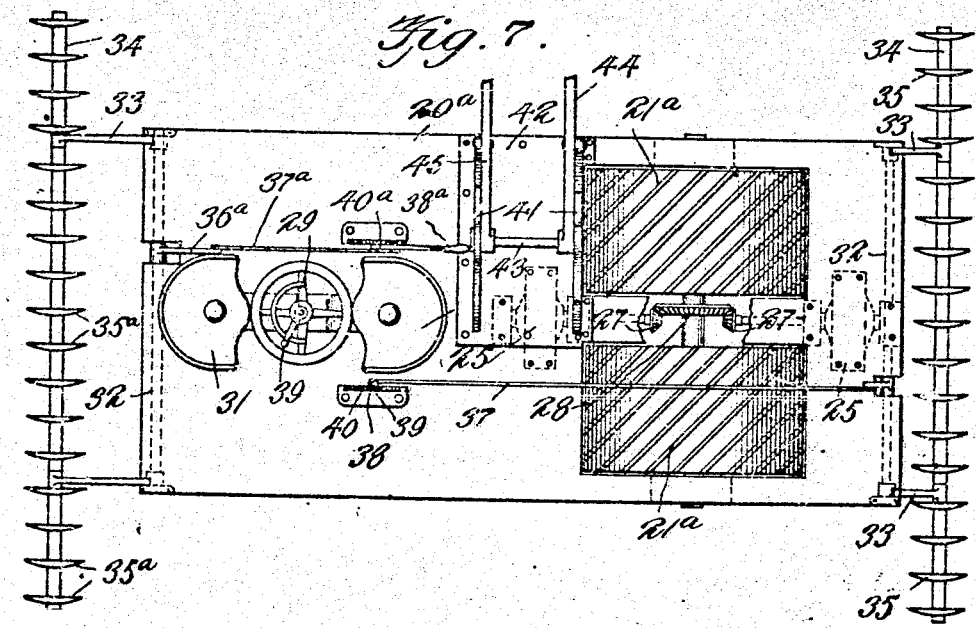

UNITED STATES PATENT OFFICE.

CHASTIAN TAURMAN, OF CINCINNATI, OHIO.

ELECTRICALLY-OPERATED AGRICULTURAL IMPLEMENT.

971,574.  Specification of Letters Patent.  Patented Oct. 4, 1910.

Application filed December 30, 1909. Serial No. 535,569.

*To all whom it may concern:*

Be it known that I, CHASTIAN TAURMAN, a citizen of the United States, residing at Cincinnati, in the county of Hamilton and State of Ohio, have invented certain new and useful Improvements in Electrically-Operated Agricultural Implements, of which the following is a specification.

This invention relates to electrically operated agricultural implements and one of the principal objects of the same is to provide an electric system for propelling an agricultural implement to and fro over a large tract of land to cultivate the same economically and quickly.

Another object of the invention is to provide an electric system comprising a series of poles located at opposite ends of a field to be cultivated, said poles supporting guide wires and providing positive and negative line wires supported at their ends upon the guide wires, and a truck carrying trolleys in contact with the line wires, said truck having mounted thereon agricultural implements of the required type at opposite ends thereof so that the truck may be moved in opposite directions by raising and lowering the implements at the opposite ends thereof, said truck carrying also a pair of electric motors and a controller.

Still another object of the invention is to provide an electrically operated agricultural implement comprising a truck having a tower supported thereon and a pair of trolleys connected to the tower to engage the line wires of the system, said trolley wires being supported at intervals by portable towers mounted on wheels and adapted to be lifted from the ground by the trolleys as the agricultural implement passes the same, said portable towers being deposited upon the ground in proper position to support the line wires extending across the field.

Another object of the invention is to provide a simple and efficient electric system, by means of which an agricultural implement may be conveyed back and forth across a field to be cultivated without requiring the implement to be turned at the end of each trip across the field.

These and other objects may be attained by means of the construction illustrated in the accompanying drawings in which, Figure 1 is a view in elevation of a pair of poles supporting laterally movable trolley wires and portable towers for supporting the trolley wires intermediate the poles. Fig. 2 is a side elevation of one of the portable towers lifted from the ground by the trolley poles supported upon the platform of the agricultural implement. Fig. 3 is a top plan view of the trolley poles and the means for supporting the same upon the platform of the agricultural implement. Fig. 4 is an enlarged side elevation of the top of one of the poles showing the trolley wires provided with grooved wheels mounted upon the guide wires, the latter being shown in section. Fig. 5 is a detail longitudinal section of the telescopic spring-actuated section of one of the trolley poles mounted on the implement. Fig. 6 is a side elevation of the truck upon which is mounted the agricultural implements and which carry the trolley poles. Fig. 7 is a top plan view of the same with parts being shown in dotted lines and the trolley poles being shown broken away at their outer ends.

Referring to the drawings the numerals 1 designate poles located in series at the ends of the field to be cultivated. It is to be understood that these poles are located at the required distance apart to support the guide wires for the trolley wires. Secured to the inner sides of the poles 1 near their upper ends are the brackets 2 and 3, said brackets each having a curved arm 4, 5. Supported upon each of the curved arms 4 and 5 are guide wires 6, 7 which are supplied with an electric current from a suitable source at one or both ends of the field.

The positive and negative trolley wires 8 and 9 are each provided with a bracket 10 upon which is journaled the grooved wheels 11 mounted to run upon the guide wires 6 and 7, as shown more particularly in Fig. 4. The trolley wires 8 and 9 are separated by means of a suitable space bar 12. The portable towers for supporting the trolley lines at points between the poles 1 each comprise the diverging bars 13, the standard 14, the cross bar 15 and the arms 16, the latter being provided each with a terminal weight or ball 17. A ground wheel 18 is journaled at the lower end of the standard 14. At the upper end of the standard 14 is a suitable yoke 19 having inwardly curved arms 20, 21 and supported upon these arms are the trolley wires 8 and 9. The agricultural implement comprises a truck provided with a platform 20ᵃ having journaled thereon, a pair of ground wheels 21ᵃ. A pilot wheel 22 is journaled in a suitable yoke 23 underneath the platform 20ᵃ, said pilot wheel being operated by means of a hand wheel 24 for steering the truck.

A pair of electric motors 25 is supported under the platform 20ᵃ, the shafts 26 of said motors being provided with beveled gears 27 which engage a beveled wheel 28 on the shaft of the ground wheels 21ᵃ, as shown more particularly in Fig. 7. Wires $x$ lead from the motors to a suitable controller 29 mounted upon the steering post and provided with a suitable lever 30 for reversing the movement of the truck. Seats 31 for the driver are mounted upon the platform 20ᵃ in opposite positions to permit the driver to face the front of the machine when going in either direction.

Shafts 32 are journaled one at each end of the platform 20ᵃ and supported upon these shafts by means of brackets 33 are the shafts 34, each provided with a series of disk plows 35. For raising and lowering the disks 35 a suitable lever 36 is connected to one of the shafts 32, and provided with a connecting rod 37 which extends to a suitable lever 38, pivoted at 39, upon a rack 40, said lever being operated to raise and lower the disks 35, depending upon the direction at which the implement is to be moved. A similar series of disk plows 35ᵃ are mounted upon the shaft 32 at the opposite end of the platform 20ᵃ, said disks being raised and lowered by means of a lever 36ᵃ having a connecting rod 37ᵃ extending to a suitable lever 38ᵃ pivoted to a rack 40ᵃ.

Supported upon the truck 20ᵃ is a rigid tower comprising the side frame bars 41, supported upon a plate 42 bolted to the platform 20ᵃ. A shaft 43 extends across from one of the frame bars 41 to the other and supported upon the shaft 43 are the rigid trolley poles 44, 45. said poles being held in position by means of curved arms 45ᵈ formed upon the frame bars 41. The trolley poles are secured to the arms 45 by means of suitable bolts 46. The trolley pole 44 at its outer end is provided with a grooved wheel 47 which engages the trolley wire 9. The trolley pole 45 is made in two telescopic sections, the outer section 45ᵃ of which extends into the section 45, as shown in Fig. 5, is provided with a spring 48, one end of which is connected to a flange 49 on the section 45ᵃ, while the opposite end of said spring is connected to a similar flange 50 on the section 45. The spring 48 is covered by a sleeve 51.

The tension of the spring 40 is exerted to draw the grooved wheel 52 on the end of the trolley section 45ᵃ into contact with the trolley wire 8 and as the trolley posts pass the portable towers the latter are lifted off the ground. After the truck passes the towers they are again deposited on the ground.

The operation of my invention may be briefly described as follows: The truck carrying agricultural implements of any suitable character is moved across the field, the trolley wheels passing underneath the trolley wires at the top of the supporting towers and lifting said towers from the ground to place them on the unworked land and to support the trolley wires in line with the trolley wheels of the moving truck. When the truck arrives at one end of the field the controller is operated to reverse the motors and carry the truck across the field on a furrow line.

From the foregoing it will be obvious that any form of agricultural implement can be connected to the truck and that the entire cultivation of large tracts of land can be readily accomplished by means of my system with only slight changes in the characters of the implements used. When the system has once been installed the cost of maintenance is but slight considering the immense amount of labor saved.

My system is particularly designed for cultivating large tracts of level land and for this purpose is economical and efficient.

Having thus fully described the invention what is claimed as new is:

1. An electric system for operating agricultural implements comprising supporting poles, guide wires on said poles, trolley wires mounted to move on said guide wires, portable towers for supporting the trolley wires, said portable towers each being provided with a yoke for supporting the trolley wires, a truck carrying agricultural implements, trolleys supported upon said truck, one of said trolleys being telescopic, electric motors on said truck, and means for raising and lowering the agricultural implements.

2. Electrically operated agricultural implements comprising a truck, motors mounted on the truck, a rigid trolley and a telescopic trolley mounted on the truck, a pilot wheel, a steering post, a controller, means for raising and lowering the agricultural implements, a laterally movable trolley line supported at its ends upon guide wires, and portable towers each provided with a yoke for supporting the trolley wires intermediate their ends.

3. In a system of the character described, a laterally movable trolley line, portable towers for supporting the trolley lines intermediate the ends thereof, said towers each comprising an upright, an arm, a diverging frame, a supporting yoke for the trolley wires, a supporting wheel and counterweights, and a truck provided with agricultural implements and trolley poles for engaging the trolley lines, one of said trolley poles being telescopic.

In testimony whereof I affix my signature in presence of two witnesses.

CHASTIAN TAURMAN.

Witnesses:
OSCAR H. FORSTER,
DANIEL M. THORPE.